US012303848B2

(12) United States Patent
Seiler

(10) Patent No.: US 12,303,848 B2
(45) Date of Patent: May 20, 2025

(54) MIXER HAVING A CLOSING COVER

(71) Applicant: Maschinenfabrik Gustav Eirich GmbH & Co. KG, Hardheim (DE)

(72) Inventor: Andreas Seiler, Tauberbischofsheim (DE)

(73) Assignee: Maschinenfabrik Gustav Eirich GmbH & Co. KG, Hardheim (DE)

( * ) Notice: Subject to any disclaimer, the term of this patent is extended or adjusted under 35 U.S.C. 154(b) by 904 days.

(21) Appl. No.: 17/599,617

(22) PCT Filed: Mar. 27, 2020

(86) PCT No.: PCT/EP2020/058738
§ 371 (c)(1),
(2) Date: Sep. 29, 2021

(87) PCT Pub. No.: WO2020/201102
PCT Pub. Date: Oct. 8, 2020

(65) Prior Publication Data

US 2022/0161209 A1 May 26, 2022

(30) Foreign Application Priority Data

Apr. 4, 2019 (DE) .................... 10 2019 108 869.0

(51) Int. Cl.
*B01F 29/80* (2022.01)
*B01F 35/45* (2022.01)

(52) U.S. Cl.
CPC ............. *B01F 29/80* (2022.01); *B01F 35/45* (2022.01)

(58) Field of Classification Search
CPC ...... B01F 35/45; B01F 35/451; B01F 35/452; B01F 29/25; B01F 29/80
See application file for complete search history.

(56) References Cited

U.S. PATENT DOCUMENTS 4,019,532 A 4/1977 Schittek
4,023,719 A 5/1977 Noyon
(Continued)

FOREIGN PATENT DOCUMENTS

CN 1303809 A 7/2001
CN 105983356 A 10/2016
(Continued)

OTHER PUBLICATIONS

Luck, K., Modler, K.-H. Getriebetechnik. 2. Auflage; Berlin [u.a.]: Springer-Verlag, 1995. S. 33-52, S. 207 und S. 227-228—ISBN-13: 978-3-540-57001-1.
(Continued)

*Primary Examiner* — Elizabeth Insler
(74) *Attorney, Agent, or Firm* — MEDLER FERRO WOODHOUSE & MILLS PLLC

(57) ABSTRACT

A mixer includes a mixing container held in a machine stand, with an outlet opening in the bottom of the mixing container, and a closure cover which can be reciprocated between a closed position in which the closure cover closes the outlet opening and an opened position in which the closure cover does not close the outlet opening. The closure cover is connected to the machine stand by way of a four-bar linkage including four rotary joints, wherein a first and a second rotary joint of the four-bar linkage are arranged on the closure cover and a third and a fourth rotary joint of the four-bar linkage are arranged on the machine stand.

14 Claims, 4 Drawing Sheets

(56) References Cited

U.S. PATENT DOCUMENTS

| | | | | |
|---|---|---|---|---|
| 4,444,509 | A * | 4/1984 | Steiner .................... | B01F 29/64 366/186 |
| 4,854,715 | A | 8/1989 | Eirich et al. | |
| 5,249,861 | A | 10/1993 | Thomson | |
| 6,669,360 | B1 | 12/2003 | Adelmann et al. | |
| 8,561,314 | B2 | 10/2013 | Gunter | |
| 8,672,194 | B2 * | 3/2014 | Moretto ................. | B65D 88/32 222/239 |
| 2010/0132210 | A1 | 6/2010 | Kruger | |
| 2013/0016581 | A1 | 1/2013 | Doerr et al. | |

FOREIGN PATENT DOCUMENTS

| | | | |
|---|---|---|---|
| CN | 106955621 | A | 7/2017 |
| DE | 243 627 | C | 2/1912 |
| EP | 1 103 492 | A1 | 5/2001 |
| FR | 692088 | A | 10/1930 |
| GB | 1447840 | A | 9/1976 |
| JP | 61-283330 | A | 12/1986 |
| JP | 2001-206485 | A | 7/2001 |
| JP | 2005-296805 | A | 10/2005 |
| RU | 2450225 | C2 | 5/2012 |
| RU | 2560371 | C2 | 8/2015 |
| WO | WO-2011/128435 | A1 | 10/2011 |

OTHER PUBLICATIONS

Search Report dated Jan. 30, 2020 for DE 10 2019 108 869.0.

International Search Report and Written Opinion mailed Jul. 20, 2020 for PCT/EP2020/058738.

First Chinese Office Action issued in Chinese patent application No. 202080026762.2, dated Jun. 6, 2022.

* cited by examiner

MIXER HAVING A CLOSING COVER

CROSS-REFERENCE TO PRIOR APPLICATIONS

This application is a national stage entry of International Application No. PCT/EP2020/058738 filed Mar. 27, 2020, which claims benefit of German Patent Application No. 10 2019 108 869.0 filed Apr. 4, 2019, both of which are herein incorporated by reference in their entirety.

The invention concerns a mixer comprising a mixing container held in a machine stand, wherein the mixing container has an outlet opening in its bottom, and there is provided a closure cover which can be reciprocated between a closed position in which the closure cover closes the outlet opening and an opened position in which the closure cover does not close the outlet opening.

Such mixing devices are known. Frequently they have a container rotatable about a container axis. In addition a rotatable mixing tool is often arranged in the interior of the container. In that arrangement the mixing tool is rotatable about a mixer shaft arranged parallel to the axis of rotation of the container, wherein for example mixing blades are fixed to the mixer shaft.

Figure 1:
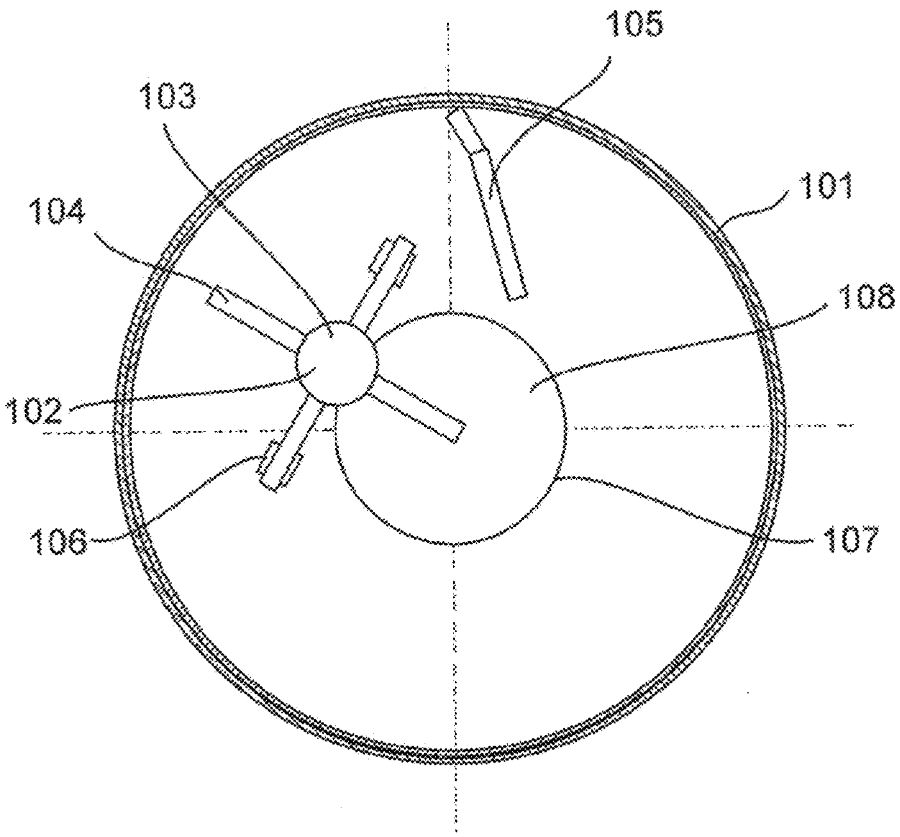
Fig. 1 Prior Art
Figure 2:
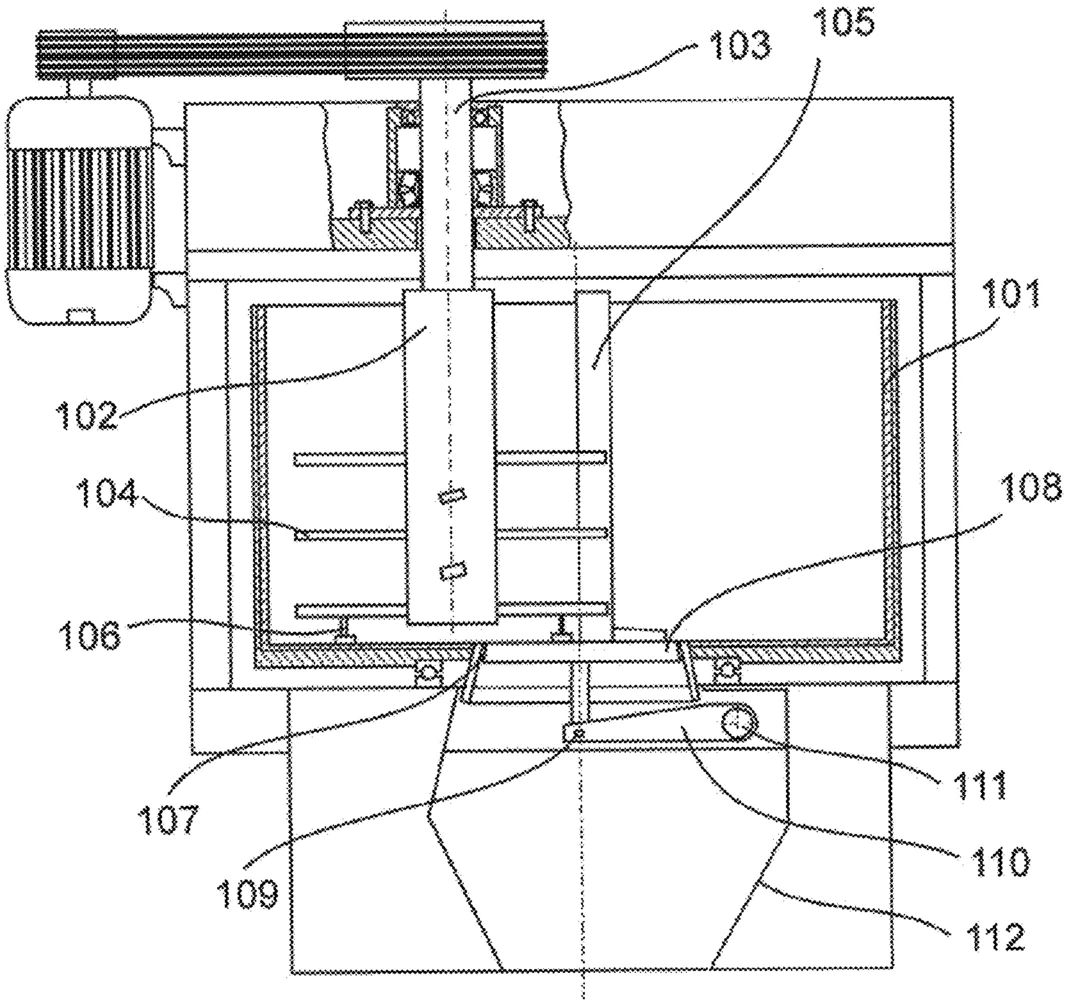
Fig. 2 Prior Art

Such a mixing device is known for example from WO 2011/128435 A1 or EP 1103492 A1. FIGS. 1 and 2 show a mixing device substantially corresponding to the mixing device known from WO 2011/128435 A1. In that arrangement FIG. 1 shows a plan view of a mixing container while FIG. 2 shows a sectional view through the mixing device.

The cylindrical mixing container 101 has a cantilever-mounted mixing tool 102 arranged eccentrically in the mixing container, on a central shaft 103 with laterally arranged mixing blades 104 and a stationary wall/bottom scraper 105 mounted in cantilever relationship vertically from above. Fixed to the lowermost blade plane of the mixing tool 102 are vertically downwardly projecting bottom blades 106 which operate at a small spacing relative to the surface of the container bottom.

An emptying opening 107 is disposed in the centre of the mixing container 101. The emptying opening 107 can be closed with the closure cover 108. In the illustrated embodiment the closure cover 108 is connected to a carrier arm 110 by way of a mounting fork and the mounting pin 109 and is thus pivotable about the tilt axis of the mounting pin 109. The carrier arm 110 is mounted rotatably by way of the pivot shaft 111. A return element which is not shown provides that, without the action of an external force, the closure cover 108 assumes a given position relative to the carrier arm 110.

When the emptying opening 107 is closed, that is to say the closure cover 108 is positioned within the emptying opening 107, the closure cover 108 terminates flush with the bottom of the container. As a result a flat bottom surface is formed, on which the material to be mixed is moved. That ensures efficient thorough mixing of all the material to be mixed, as above the closure cover there is no dead space which is not reached by the bottom blades 106.

The demands in terms of the closure cover being disposed flush with the container bottom gives rise to difficulty in regard to design configuration and guidance of the closure cover.

Basically the closure cover would have to be moved linearly downwardly to open the emptying opening. That however would have the consequence that, by virtue of the arrangement of the emptying opening in the bottom of the container, the material to be mixed would flow over all edge surfaces of the closure cover and would possibly even soil the drive of the closure cover. In addition a residual heap of material to be mixed would remain lying on the flat closure cover and would not flow out with the rest of the material to be mixed. It is however not possible for the closure cover to pivot laterally outwardly out of the emptying opening by virtue of the substantially cylindrical or frustoconical contact surfaces of the closure cover and the emptying opening.

In the case of mixing containers and closure covers which are provided with a replaceable wearing coating and quite particularly in the case of mixing containers which are additionally vacuum-tight it has been found that cylindrical contact surfaces of closure cover and emptying opening are particularly well-sealed. Due to the thickness of the mixing container bottom and the wearing coating fixed thereon however the closure cover upon opening has to be moved a very long distance as parallel as possible to the inside of the emptying opening along the cylindrical contact surfaces before it can make the transition into a pivotal movement. Preferably in that case the closure cover top side pivots downwardly in the direction of the axis of the emptying opening in order to allow the material to be mixed which is disposed thereon to flow away completely. For that reason the drive of the closure cover that is shown in FIG. 2 allows a pivotal movement both about the axis 111 and also about the axis 109 in conjunction with the return element. The known closure cover with return element, like for example shown in EP 1103492 A1, is expensive to manufacture and cannot be readily cleaned. Because of the rotary movement of the closure cover the closure cover must have a certain clearance within the emptying opening, in order that it can be pivoted out of the emptying opening. Due to the gap which is formed as a result constituents of the material to be mixed can escape from the container even when the emptying opening is closed. In addition the closure cover has to be very thoroughly cleaned after each emptying operation, in order to ensure that it can be positioned in the opening again and reliably seals. Furthermore material to be mixed can accumulate in the region of the pivot axis 109 which is beneath the closure cover and impede the pivotal movement.

Taking the above-described state of the art the object of the present invention is therefore to provide a mixer whose emptying opening can be easily opened and closed and in which the risk of soiling of the drive of the closure cover is markedly less.

According to the invention that object is attained in that the closure cover is connected to the machine stand by way of a four-bar linkage comprising four rotary joints, wherein a first and a second rotary joint of the four-bar linkage are arranged on the machine stand and a third and a fourth rotary joint of the four-bar linkage are arranged on the closure cover.

The movement of the closure cover relative to the machine stand and thus also relative to the mixing container can be individually adapted by means of a four-bar linkage. In that case the third and fourth rotary joints can be arranged directly on the closure cover. Alternatively a further element could also be fixed to the closure cover, on which the third and fourth rotary joints are arranged.

In that respect it is advantageous if all joint axes of the four-bar linkage are arranged parallel to each other.

In a preferred embodiment the first joint of the four-bar linkage is connected to the fourth joint of the four-bar linkage by way of a crank element. The joint axes of the first and fourth joints are spaced from each other at a spacing c. The second joint of the four-bar linkage is connected to the third joint of the four-bar linkage by way of a lever element. The joint axes of the second and third joints are spaced from each other at a spacing a. The third joint of the four-bar linkage is connected to the fourth joint of the four-bar linkage by way of a coupling element of the length f, the joint axes of the third and fourth joints being spaced from each other at a spacing b. The coupling element can therefore be longer than the spacing b. The joint axes of the first and second joints are spaced from each other at a spacing g.

In addition in a particularly preferred embodiment it is provided that the closure cover is fixed to the coupling element. In that case the coupling element can extend not only between the third and fourth joints but also as far as the closure cover. The third joint can be arranged on the end of the coupling element, that is opposite to the closure cover.

To provide for the driven movement of the closure cover in and out of the emptying opening a preferred embodiment provides that either the joint axis of the second joint is in the form of a shaft, wherein there is provided a drive for rotating the shaft and the lever element is fixed to the shaft in such a way that the lever element rotates about the joint axis of the joint when the shaft is rotated, or preferably the joint axis of the first joint is in the form of a shaft, wherein there is provided a drive for rotating the shaft and the crank element is fixed to the shaft in such a way that the crank element rotates about the joint axis of the joint when the shaft is rotated.

Therefore to open and close the closure cover the shaft only has to be driven to implement the desired movement of the closure cover.

In a further preferred embodiment it is provided that the coupling element is arranged substantially perpendicularly to the closure cover.

In general the closure cover has a flat inside surface which in the closed position faces into the interior of the mixing cover, an outside surface which is opposite to the inside surface and a peripherally extending edge surface connecting the inside surface and the outside surface together. Arranging the coupling element perpendicularly to the closure cover means that the coupling element is arranged perpendicularly to the inside surface of the closure cover and in that respect does not extend into the interior of the mixing container.

By way of example the joint axes of the third and fourth joints as well as the connecting point at which the coupling element is connected to the closure cover lie in a common plane which extends perpendicularly to the outside surface and/or the inside surface of the closure cover.

In a further preferred embodiment the length a is less than the length c. By virtue of the fact that the lever element is of a shorter length than the crank element, this produces a movement which is firstly substantially linear in order to move the closure cover out of the closure opening, and which then makes the transition into a pivotal movement.

In that case it is advantageous if the length c approximately corresponds to the sum of the length a and the spacing e, so that $0.9 \le (a+e)/c \le 1.1$, preferably $0.95 \le (a+e)/c \le 1.05$ and particularly preferably $c=a+e$. In that case e is the spacing between the first and the second joint axes in a direction perpendicular to a straight line connecting the third and fourth joint axes. The spacing b is the spacing between the first and second joint axes in a direction parallel to the straight line connecting the third and fourth joint axes. Therefore the spacing g derives from the equation: $e^2+d^2=g^2$.

In a further preferred embodiment the first joint is closer to the plane in which the outlet opening is disposed, than the second joint.

It is further advantageous if the fourth joint is closer to the closure cover than the third joint.

In addition in a particularly preferred embodiment it is provided that in the closed position of the closure cover the crank element and the lever element extend substantially parallel to each other. It is further preferred that in the closed position of the closure cover the crank element and the lever element with the coupling element form an angle between 80° and 100°. In addition it is advantageous if the ratio of the length f of the coupling element to the spacing b between the third and fourth joint axes is between 2 and 10.

In a further preferred embodiment $0.75 \le d/b \le 1.5$ and particularly preferably $0.85 \le d/b \le 1.2$.

Advantageously the crank element and the lever element are bar-shaped. Preferably the coupling element is also bar-shaped.

In a further preferred embodiment it is provided that the lengths of the crank element, the coupling element and the lever element as well as the positions of the four joints are so matched that in the movement of the closure cover from the closed position into the open position the projection of the edge of the closure cover, that is towards the shaft, on to the container bottom, is not in the region of the outlet opening.

This design configuration ensures that upon opening of the closure cover as little material to be mixed that falls out of the closure opening as possible drops on to the crank element, the lever element and the third and fourth joints and soils same to such a severe degree that the movement of the four-bar linkage is adversely influenced. Basically the closure cover shields the four-bar linkage from falling material to be mixed, which markedly enhances the service life of the linkage. In addition the cleaning involvement is reduced as the joints are generally not soiled by material to be mixed.

In a further preferred embodiment the closure cover is circular with a radius r, wherein preferably the coupling element is connected at the centre point of the closure cover to same.

It is further advantageous if $a \le c$ and preferably $0.1 \le r/a \le 1.2$.

In a further preferred configuration the ratio a/e: $0.9 \le a/e \le 20$ and particularly preferably $1.0 \le a/e \le 10$. That is advantageous in particular when c approximately corresponds to the sum of a and e.

In a further preferred embodiment the mixing container is rotatable about a mixing container axis and the four-bar linkage is so arranged that it does not rotate together with the mixing container about the mixing container axis. In a further particularly preferred embodiment a straight line extends through the third and fourth joint axes om the mixing container axis and through the centre point of the closure cover.

Figure 3:
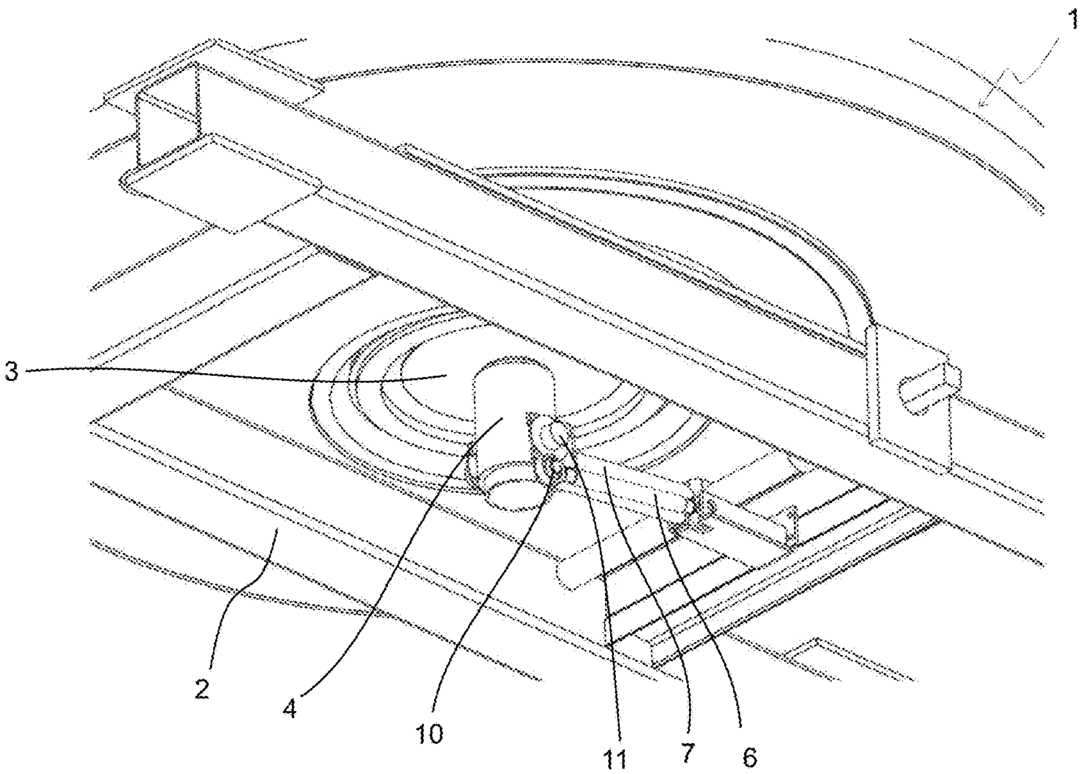
Figure 4:
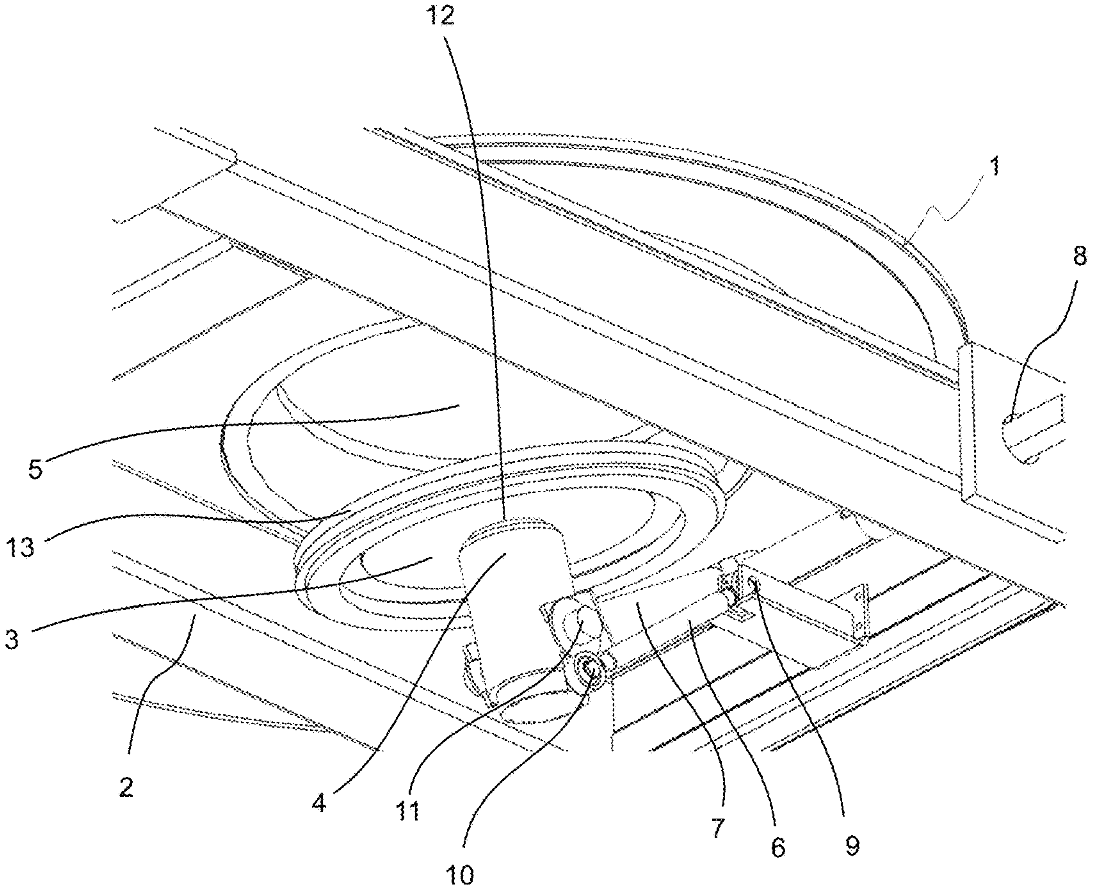
Figure 5:
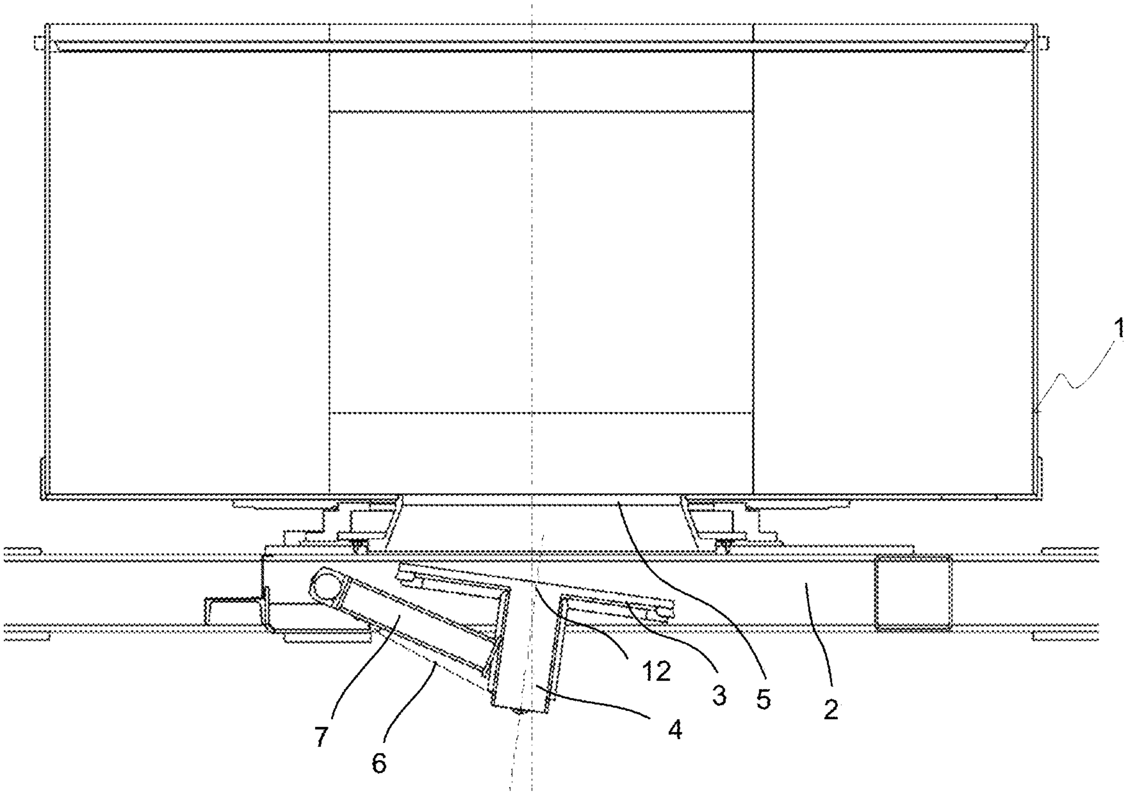
Figure 6:
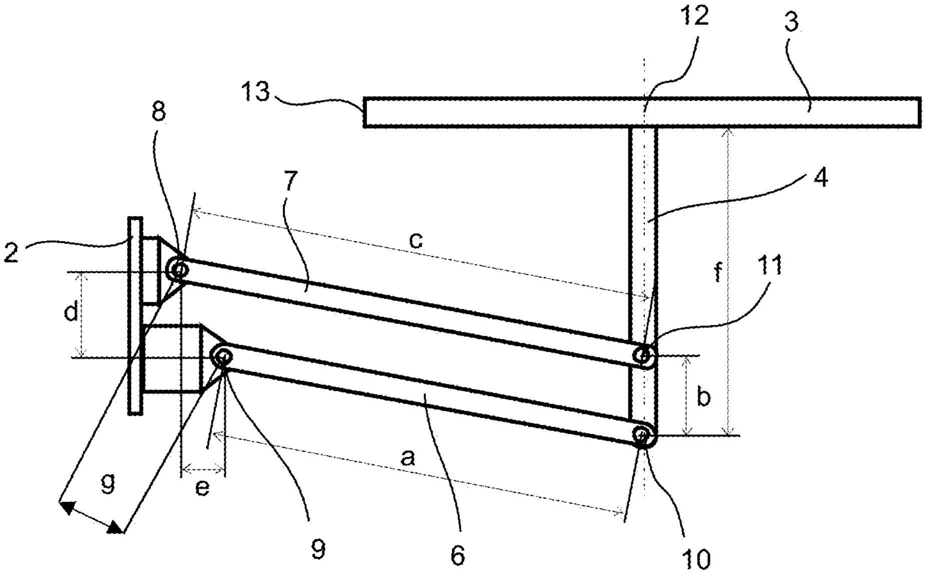

Further advantages, features and possible uses will be apparent from the description hereinafter of a preferred embodiment and the accompanying Figures in which:

FIG. 1 shows a plan view of a mixing container of the state of the art,

FIG. 2 shows a side view in section through the mixing device and the mixing container installed therein in FIG. 1, FIG. 3 shows a perspective view from below of an embodiment according to the invention, FIG. 4 shows a perspective view of the FIG. 3 embodiment with opened closure, FIG. 5 shows a side view in section through the embodiment of FIG. 4, and FIG. 6 shows a diagrammatic view of a four-bar linkage according to the invention.

FIGS. 1 and 2 show a mixer from the state of the art, which has already been described hereinbefore.

FIG. 3 shows a perspective view from below of an embodiment of the mixer according to the invention. The Figure shows the bottom of a cylindrical mixing container 1 which is mounted rotatably on a machine stand 2. Shown at the underside of the mixing container 1 is a closure opening in which a closure cover 3 is arranged. The closure cover 3 is fixed to a coupling element 4, on which the third joint axis 10 and the fourth joint axis 11 are in turn arranged.

FIG. 4 shows a perspective view of the mixer according to the invention with a closure cover in the (partly) opened position. The closure cover 3 has an edge surface 13. The coupling element 4 is connected to the closure cover 3 which in the illustrated position is not exactly in the closed position. In the illustrated embodiment the closure cover is round and the coupling element is connected to the centre point 12 of the circular shape of the closure cover 3. The outlet opening 5 is disposed at the bottom of the mixing container 1. The coupling element 4 is connected to the machine stand 2 both by way of a crank element 7 and also by a lever element 6.

Fixed to the machine stand are a first rotary joint 8 which is engaged by the crank element and a second rotary joint 9 engaged by the lever element.

The crank element is driven by way of a shaft by way of the rotary joint 8, from a corresponding drive (not shown), so that the crank element 7 can be rotated about the joint axis of the shaft in order to reciprocate the closure cover 3 between the closed position and the opened position. It is also possible to see the coupling element 4 on which are disposed the third axis for the third rotary joint 10 and the axis for the fourth rotary joint 11.

FIG. 5 shows a side view of the mixer according to the invention as shown in FIG. 4 in the (partly) opened position of the closure cover.

FIG. 6 shows a diagrammatic view of the mechanism. The four-bar linkage has a first and a second rotary joint 8, 9 fixed to the machine stand 2. The third rotary joint 10 and the fourth rotary joint 11 are fixed to the coupling element 4.

The first rotary joint 8 is connected to the fourth rotary joint 11 by way of a crank element 7. The second rotary joint 9 is connected to the third rotary joint 10 by way of a lever element 6.

The coupling element 4 not only connects the third rotary joint 10 and the fourth rotary joint 11 but extends as far as the closure cover 3 and there engages the centre point of the closure cover at 12. The coupling element is perpendicular to the closure cover. The third rotary joint 10 is at the end of the coupling element 4, that is opposite to the closure cover 3.

The point 13 of the edge surface of the closure cover 3 that is towards the first and second rotary joints 8, 9 should as far as possible not move further away from the first rotary joint 8 in the movement from the closed position into the opened position in a direction parallel to the bottom surface of the mixing container in order to ensure that no material to be mixed drops on to the first rotary joint 8 or the second rotary joint 9. At the same time in that case the closure cover 3 also covers the rotary joints 10 and 11 to prevent soiling with material to be mixed.

In the illustrated embodiment the lever element 6 is of a length of 500 mm. The crank element is of a length c of 600 mm. The coupling element 4 is of an overall length of 350 mm, wherein the third and the fourth rotary joints are spaced from each other by a spacing b of 60 mm. The spacing d between the first and second rotary joints, like the spacing b, is also 60 mm. The closure cover is of a radius r of 250 mm.

LIST OF REFERENCES

- 1 mixing container
- 2 machine stand
- 3 closure cover
- 4 coupling element
- 5 outlet opening
- 6 lever element
- 7 crank element
- 8, 9, 10, 11 rotary joint
- 12 centre point of the closure cover
- 13 edge surface
- 101 mixing container
- 102 mixing tool
- 103 central shaft
- 104 mixing blade
- 105 wall/bottom scraper
- 106 bottom blade
- 107 emptying opening
- 108 closure cover
- 109 mounting pin
- 110 carrier arm
- 111 pivotal shaft
- 112 transfer box

The invention claimed is:

1. A mixer comprising:

a mixing container held in a machine stand, with an outlet opening in the bottom of the mixing container; and a closure cover which can be reciprocated between a closed position in which the closure cover closes the outlet opening and an opened position in which the closure cover does not close the outlet opening, wherein the closure cover is connected to the machine stand by way of a four-bar linkage comprising four rotary joints, and wherein a first and a second rotary joint of the four-bar linkage are arranged on the machine stand and a third and a fourth rotary joint of the four-bar linkage are arranged on the closure cover, wherein the mixing container and the four-bar linkage are arranged such that the mixing container is rotatable about a mixing container axis while the four-bar linkage does not rotate about the mixing container axis.

2. The mixer according to claim 1, wherein all joint axes of the four-bar linkage are arranged parallel to each other.

3. The mixer according to claim 1, wherein the first joint of the four-bar linkage is connected to the fourth joint of the four-bar linkage by way of a crank of the length c, the second joint of the four-bar linkage is connected to the third joint of the four-bar linkage by way of a lever of the length a, the third joint of the four-bar linkage is connected to the fourth joint of the four-bar linkage by way of a coupling part of the closure cover, wherein the joint axes of the third and fourth joints are spaced from each other at a spacing b, wherein the joint axes of the first and second joints are spaced from each other at a spacing g, wherein e is the spacing between the first and the second joint axes in a direction perpendicular to a straight line connecting the third and the fourth joint axes and d is the spacing between the first and the second joint axes in a direction parallel to the straight line connecting the third and the fourth joint axes, wherein a) the first joint is arranged closer to the plane in which the outlet opening is disposed than the second joint and/or b) the fourth joint is closer to the closure cover than the third joint.

4. The mixer according to claim 3, wherein $0.9 \leq (a+e)/c \leq 1.1$.

5. The mixer according to claim 3, wherein the closure cover is fixed to the coupling part.

6. The mixer according to claim 3, wherein either the joint axis of the second joint is in the form of a shaft that can be rotated by a drive for rotating the shaft and the lever is fixed to the shaft in such a way that the lever rotates about the joint axis of the joint when the shaft is rotated, or the joint axis of the first joint is in the form of a shaft that can be rotated by a drive for rotating the shaft and the crank is fixed to the shaft in such a way that the crank rotates about the joint axis of the joint when the shaft is rotated.

7. The mixer according to claim 6, wherein the lengths of the crank, the coupling part and the lever as well as the positions of the four joints are so matched that in the movement of the closure cover from the closed position into the opened position the projection of the edge of the closure cover, that is towards the shaft, on to the container bottom, is not in the region of the outlet opening.

8. The mixer according to claim 3, wherein the coupling part is arranged substantially perpendicularly to the closure cover.

9. The mixer according to claim 3, wherein the length f of the coupling part in relation to the spacing b between the joint axes three and four is in the ratio $2 \leq f/b \leq 10$.

10. The mixer according to claim 3, wherein the following applies for the ratio of the spacing d to the spacing b: $0.75 \leq d/b \leq 1.5$.

11. The mixer according to claim 3, wherein in the closed position of the closure cover the crank and the lever extend substantially parallel to each other.

12. The mixer according to claim 3, wherein the closure cover is circular with a radius r, and wherein the coupling part is connected to the closure cover at the centre point thereof.

13. The mixer according to claim 12, wherein $a \leq c$ and $0.1 \leq r/a \leq 1.2$.

14. The mixer according to claim 3, wherein a straight line which extends through the third and fourth joint axes is on the mixing container axis and extends through the centre point of the closure cover.

* * * * *